Patented Oct. 1, 1940

2,216,135

UNITED STATES PATENT OFFICE 2,216,135

MANUFACTURE OF ABRASIVE ARTICLES

Edwin T. Rainier, Nutley, N. J., assignor, by mesne assignments, to United States Rubber Company, New York, N. Y., a corporation of New Jersey No Drawing. Application May 21, 1937, Serial No. 143,938

7 Claims. (Cl. 51—298)

This invention relates to improvements in the manufacture of abrasive articles, and more particularly abrasive grinding wheels.

Organic-bonded grinding wheels are usually composed of abrasive grains, such as grains of crystalline alumina or silicon carbide or equivalent substances, united into an integral, shaped article by a bond of hard organic material. Such a bond is usually produced from a thermo-setting substance like vulcanizable hard rubber compositions or resinoids like Bakelite, or a mixture of such. It is customary to incorporate in the organic bonds other materials such as asphalt, wax, shellac, etc., which render the wheels very fast-cutting, but soft, fast-wearing, and unsuitable for heavy service, or mineral fillers such as clay, ferric oxide, barytes, zinc oxide, etc., which render the wheels harder and more resistant to wear at high grinding pressures, but slower-cutting.

An object of the invention is to provide improved organic thermo-setting compositions as binders for abrasive articles. A further object is to provide a grinding wheel in which the organic bond is modified by the inclusion of a relatively cheap non-toxic mineral filler or fillers adapted to reduce the rate of wheel wear, for equivalent rates of metal removal, to one-half to two-thirds that of abrasive wheels containing fillers such as clay, zinc oxide or whiting. Further objects will be apparent from the following description.

According to the invention, I form an abrasive article, such as a grinding wheel, by bonding together grains of an abrasive material, such as crystalline alumina or silicon carbide or the like, with a heat-hardening organic bond, such as a vulcanizable rubber compound, a heat-hardening resin such as "Bakelite," or a mixture of resins with a vulcanizable rubber compound, the bond being modified by the incorporation therein by any suitable means of one or more of the anhydrous, water-soluble non-oxidizing inorganic alkali or alkaline earth metal salts whose melting points are within the range 700° C. to 1200° C. Whereas sodium chloride and sodium carbonate are preferred, advantageous results may be obtained with other well-known salts of the class described including potassium chloride, potassium carbonate, sodium sulphate, potassium sulphate, lithium sulphate, sodium pyrophosphate, potassium pyrophosphate, calcium chloride, calcium bromide, magnesium sulphate, barium chloride, barium bromide, magnesium chloride, magnesium bromide, strontium chloride, all of which have the designated characteristics.

The proportion of salt to be used depends upon the nature of the organic bond and upon the purpose for which the grinding wheel is intended. In rubber bonded wheels the salt may be used in all amounts up to about 40% by volume of the total bond. As little as 10% by volume will give a marked improvement over a bond without any filler, and any amount may be used up to the point where the unvulcanized bond becomes too "dry" to hold the grains and where the vulcanized bond becomes too weak, due to dilution. In resin-bonded wheels I have obtained as much as 100% increase in the wheel life by the use as filler of an amount of salt equal to 10% of the total volume of bond. Still greater improvement is obtained by using an amount of salt equal to 20% by volume of the bond. The volume loading of the salts is not critical, but the "grade" of the wheel will depend somewhat upon the amount of salt used. For so-called snagging wheels I prefer to use the larger amounts.

I prefer to use the salts in a finely ground state—i. e. having a particle diameter of .002 inch or less; however, beneficial results have been obtained with salt crystals as large as .010 inch diameter.

The following examples are illustrative of the invention whereby to produce articles having the aforesaid improved characteristics:

*Example 1.*—Anhydrous sodium carbonate in the form known commercially as "soda ash," is first heated in an oven for an hour or so at a temperature of about 155° C. to drive off any water of crystallization that may be present and to decompose any bicarbonates present. It is then mixed with rubber, sulphur, and accelerator in the following proportions:

| | Parts by weight |
|---|---|
| Rubber | 100 |
| Sulphur | 50 |
| Soda ash | 168 |
| Accelerator | 2 |
| | 320 |

The ingredients are mixed into the rubber on the usual mixing rolls. After the rubber bond has been mixed, the abrasive grains are mixed into the rubber bond in the proportion of 30 pounds of abrasive grains (of desired sizes) to 8 pounds of the mixed bond, on mixing rolls, according to the customary practice well known in the art of making rubber bonded abrasive articles. The mixed raw rubber stock in sheeted form, together with abrasive grains of a desired grit size, are mixed by repeatedly folding and passing between the rolls, until an intimate and uniform mixture of the materials is obtained. The composition is then rolled out into sheets of a desired thickness, as by passing between calender rolls, after which it is cut to the size and shape desired. The article thus formed is vulcanized under heat and pressure in accordance with the accepted practice in the art to form a hard, vulcanized rubber product.

*Example 2.*—Ordinary table salt, rock salt, or any other grade of sodium chloride may be used. The salt is ground and screened through a 200-mesh screen. It is then combined with rubber, sulphur and abrasive grains in the following proportions:

|  | Parts by weight |
|---|---|
| Abrasive grains (of desired size) | 80.60 |
| Smoked sheet rubber | 6.48 |
| Sulphur | 3.24 |
| Sodium chloride | 9.53 |
| Accelerator | 0.15 |
|  | 100.00 |

The raw rubber in sheeted form together with abrasive grains, flour sulphur, ground salt, and accelerator are mixed by passing between mixing rolls, the crude rubber sheet being repeatedly folded and passed between the rolls while the other ingredients, in weighed amounts, are added at suitable intervals until an intimate and uniform mixture of materials is obtained, in accordance with the customary practice well known in the art of making rubber bonded abrasive articles. The composition is then rolled out into sheets of a desired thickness, after which it is cut to the size and form desired. The article thus formed is molded under heat and pressure for about 45 minutes at a temperature of 160° C., after which it is removed from the mold and the vulcanization is completed by heating it for about 15 hours in an air oven, according to one of the methods well known in the art.

*Example 3.*—Abrasive grains, "Bakelite," and sodium chloride are mixed in the following proportions:

|  | Parts by weight |
|---|---|
| Abrasive grains (of desired size) | 87.0 |
| Liquid "Bakelite" | 2.2 |
| Powdered "Bakelite" | 8.9 |
| Salt (finely ground) | 1.9 |
|  | 100.0 |

According to one of the well-known methods of making resin-bonded wheels, the abrasive grains are placed in a barrel-like container mounted so that it may be rotated about an axis through its center. While the grains are being tumbled, the liquid "Bakelite" is slowly added until the grains are coated with the liquid. Then the powdered "Bakelite" and ground salt, previously mixed and sifted, are slowly added while the barrel is being rotated and the grains tumbled. The resulting mixture will consist of individual abrasive grains coated with an intimate mixture of Bakelite and salt, and it may be poured like moist sand. The abrasive mixture is loaded into a suitable mold and cold pressed for about 3 minutes at a suitable pressure, which may be from 1000 to 5000 pounds per square inch, depending upon the porosity desired in the abrasive article. The article thus formed is removed from the mold, placed in an oven and heated for a suitable time and at a suitable temperature to harden the resin, a procedure well known in the art of making resin-bonded grinding wheels.

*Example 4.*—As an example of the application of my invention to a grinding wheel whose bond is a mixture of vulcanized hard rubber and a thermo-setting resin, I make an abrasive mixture of the following materials in the following proportions:

|  | Parts by weight |
|---|---|
| Resin coated grains: |  |
| Abrasive grains (of desired sizes) | 81.45 |
| Liquid "Bakelite" | .66 |
| Powdered "Bakelite" | 1.66 |
| Sodium chloride (ground) | 1.40 |
| Rubber compound: |  |
| Softened rubber | 5.07 |
| Sulphur | 2.98 |
| Magnesium oxide | .25 |
| Sodium chloride (ground) | 6.02 |
| Powdered "Bakelite" | .41 |
| Accelerator | .10 |
|  | 100.00 |

The abrasive grains, liquid "Bakelite," powdered "Bakelite" and finely ground sodium chloride are mixed as described in Example 3. The mixture is spread about one inch deep on plates and heated in an oven until the "Bakelite" fuses. It is then removed from the oven, cooled, disintegrated and screened, the resulting material being essentially individual abrasive grains coated with hard, non-tacky films of "Bakelite" containing salt.

The resin-coated grains are warmed and put into a mixer of the paddle type, such as a dough mixer, along with the sulphur and magnesium oxide and the sulphur is thoroughly mixed with the grains. Then the softened rubber is added and mixed in until the grains are completely coated with rubber. The softened rubber should be of such consistency that it will flow under its own weight at a temperature of about 100° C. Such softened rubber may be produced by melting ordinary smoked sheet, by the use of phenyl-hydrazine-zinc chloride sold to the trade as "R. P. A. #1" by long, continued mastication on a mill, or by any of the methods known to the art of rubber working. After the rubber is mixed with the grains, the ground sodium chloride is added while the mixing is continued. Lastly, the powdered "Bakelite" and the accelerator are added and mixed in. The resulting mixture is a sticky mass of abrasive grains, individually coated with resin films, and surrounded by a vulcanizable rubber compound.

The abrasive mixture may be tamped into suitable molds and vulcanized by heat and pressure to form abrasive articles of the desired shapes and sizes, according to the methods well known in the art of making rubber bonded abrasive articles.

While certain abrasive materials, and synthetic organic resin bonds therefor, have been referred to above in the examples, it is to be understood that the invention may be practiced with other abrasive grains and other synthetic organic resin bonds, without departing from the principle of the invention, relating more particularly to modification of the organic bond for abrasive grains by incorporation of certain mineral substances, as hereinbefore set forth, and as covered by the appended claims.

Having thus described my invention, what I claim and desire to protect by Letters Patent is:

1. An abrasive grinding wheel the abrasive grains of which are united by means of an organic bond selected from the class consisting of vulcanized hard rubber and hardened phenol-aldehyde resins having incorporated therein an anhydrous, water soluble inorganic salt of a metal of the class consisting of the alkali metals and alkaline earth metals which salt has a melting point within the range 700° C. to 1200° C.

2. An abrasive grinding wheel the abrasive grains of which are united by means of an organic bond selected from the class consisting of vulcanized hard rubber and hardened phenol-aldehyde resins having incorporated therein an anhydrous, water soluble inorganic salt of an alkali metal which salt has a melting point within the range 700° C. to 1200° C.

3. An abrasive grinding wheel the abrasive grains of which are united by means of an organic bond selected from the class consisting of vulcanized hard rubber and hardened phenol-aldehyde resins having incorporated therein an anhydrous, water soluble inorganic salt of an alkaline earth metal which salt has a melting point within the range 700° C. to 1200° C.

4. An abrasive grinding wheel the abrasive grains of which are united by means of an organic bond selected from the class consisting of vulcanized hard rubber and hardened phenol-aldehyde resins having incorporated therein sodium chloride.

5. An abrasive grinding wheel the abrasive grains of which are united by means of an organic bond selected from the class consisting of vulcanized hard rubber and hardened phenol-aldehyde resins having incorporated therein potassium chloride.

6. An abrasive grinding wheel the abrasive grains of which are united by means of an organic bond selected from the class consisting of vulcanized hard rubber and hardened phenol-aldehyde resins having incorporated therein anhydrous sodium carbonate.

7. An abrasive grinding wheel the abrasive grains of which are united by means of an organic bond selected from the class consisting of vulcanized hard rubber and hardened phenol-aldehyde resins having incorporated therein an anhydrous water-soluble alkali-metal salt selected from the class consisting of the carbonates and chlorides.

EDWIN T. RAINIER.